United States Patent
Schroeder et al.

(10) Patent No.: US 10,445,770 B2
(45) Date of Patent: Oct. 15, 2019

(54) IDENTIFYING MALICIOUS TEXT IN ADVERTISEMENT CONTENT

(71) Applicant: Facebook, Inc., Menlo Park, CA (US)

(72) Inventors: Andrew Joseph Schroeder, Austin, TX (US); Benjamin Mark Dowling, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 599 days.

(21) Appl. No.: 14/450,184

(22) Filed: Aug. 1, 2014

(65) Prior Publication Data

US 2016/0034950 A1  Feb. 4, 2016

(51) Int. Cl.
  *G06F 16/00* (2019.01)
  *G06Q 30/02* (2012.01)
  *H04L 29/06* (2006.01)
  *G06F 16/63* (2019.01)

(52) U.S. Cl.
  CPC ......... *G06Q 30/0248* (2013.01); *G06F 16/63* (2019.01); *H04L 63/1441* (2013.01)

(58) Field of Classification Search
  CPC ........ G06F 17/30616; G06F 17/30979; G06Q 30/0248; H04L 63/1441
  USPC ................. 707/731, 748; 715/773; 709/219
  See application file for complete search history.

(56) References Cited

U.S. PATENT DOCUMENTS

| | | | | |
|---|---|---|---|---|
| 8,296,130 | B2* | 10/2012 | Spears | G06F 16/9535 704/9 |
| 8,872,679 | B1* | 10/2014 | Roberts | H03M 7/42 341/106 |
| 9,027,140 | B1* | 5/2015 | Watkins | 709/219 |
| 9,405,741 | B1* | 8/2016 | Schaaf | G10L 15/08 |
| 2004/0107089 | A1* | 6/2004 | Gross | G06F 17/274 704/10 |
| 2011/0145068 | A1* | 6/2011 | King | G06F 17/211 705/14.55 |
| 2011/0191097 | A1* | 8/2011 | Spears | G06F 16/9535 704/9 |
| 2011/0242110 | A1* | 10/2011 | Cohen | G06F 17/214 345/467 |
| 2012/0197936 | A1* | 8/2012 | Fuchs | G06F 16/367 707/771 |
| 2012/0324391 | A1* | 12/2012 | Tocci | G06F 3/0237 715/773 |

(Continued)

*Primary Examiner* — Monica M Pyo
(74) *Attorney, Agent, or Firm* — Fenwick & West LLP

(57) ABSTRACT

An online system receives advertisement requests from one or more advertisers and determines whether an advertisement request includes malicious content before presenting content from the advertisement request to a user. To determine whether the advertisement request includes malicious content, the online system identifies text in the advertisement request, identifies words in the text, and identifies characters in each word. The online system identifies a most common type of character in each word and generates a score for each word based on its constituent characters. For example, a word's score is based on the combination of characters in the word, such as a conditional probability of a word including a type of character given that the word includes a given number of the most common type of character. The scores are analyzed to determine if text in the advertisement request includes malicious content.

14 Claims, 3 Drawing Sheets

(56) References Cited

U.S. PATENT DOCUMENTS

2013/0166571 A1* 6/2013 Thomas .............. G06F 3/0233
                                                      707/748
2014/0172989 A1* 6/2014 Rubinstein .......... H04L 51/32
                                                      709/206

* cited by examiner

IDENTIFYING MALICIOUS TEXT IN ADVERTISEMENT CONTENT

BACKGROUND

This disclosure generally relates to advertisements presented by an online system, and particularly to identifying malicious content in advertisements that may potentially be presented by the online system.

An online system allows its users to connect to and interact with other online system users and with objects on the online system. The online system may also present advertisements to its users. Presenting advertisements allows the online system to obtain revenue from advertisers, while allowing the advertisers to present advertisements for products or services to online system users.

However, certain advertisements provided to an online system for presentation may include malicious content included in the advertisements by an advertiser or by another entity. To protect its users, an online system often uses one or more methods to identify advertisements including malicious or potentially malicious content and to prevent the identified advertisements from being presents to online system users. Conventional methods for identifying malicious content in an advertisement entail manually reviewing an advertisement's content to determine if the advertisement includes malicious text or content or analyzing an advertisement's content using one or more automated systems to identify misspellings or grammatical errors in the advertisement content text to determine if the advertisement includes malicious content. However, reviewing large volumes of advertisements using conventional methods may be cumbersome and inefficient. Further, malicious advertisers have developed methods for circumventing conventional automated systems by using characters from different Unicode blocks or ranges to generate grammatically correct text in an advertisement.

SUMMARY

An online system receives advertisements from one or more advertisers and presents the advertisements to online system users. In one embodiment, the online system receives an advertiser request ("ad request") from an advertiser including a bid amount and advertisement content. Before determining whether to present advertisement content in an ad request, the online system analyzes the advertisement content to determine if the advertisement contains malicious content (e.g., malicious text). Ad requests determined to include malicious content are identified as ineligible to be presented to online system users.

To determine if advertisement content includes malicious content, the online system identifies text content in an advertisement and identifies words included in the text content. For example, the online system identifies words in the text content by identifying one or more characters positioned between two delimiters, such as a space or a comma, as a word. Within each word identified from the text content, the online system identifies various characters. As used herein, a "character" refers to a letter, a number, or a text symbol, as well as a representation of a character such as an American Standard Code for Information Interchange (ASCI)) code, a Unicode code point, or a group or a range of representations of characters (e.g., the Latin Unicode block or range). In one example the online system identifies Unicode characters, or a range of Unicode characters (e.g., Latin Unicode characters), in a word. As another example, the online system identifies letters, numbers, or text symbols in a word. The online system also identifies a most common type of character in each word from the characters identified from each word. For example, if a word includes 7 Latin Unicode characters and 1 Cyrillic Unicode character, the online system determines that the most common type of character in the word is the Latin Unicode character.

Additionally, the online system scores each word identified from text content of advertisement content based on the characters in each word. In one embodiment, the online system scores each word in text content of advertisement content based on the combination of types of characters in each word. For example, the online system scores a word by determining the conditional probability of the word including one or more characters of a particular type given that the word includes a certain number of characters having the most common character type. For example, the online system determines the conditional probability of a word that is 10 characters in length and that includes a single Cyrillic Unicode character given that the word includes 9 Latin Unicode characters. In another example, the online system scores a word by determining the conditional probability of each character in the word being followed by a subsequent character in the word. For example, a word includes the letter "I" followed by the letter "L," so the online system determines the conditional probability of the letter "I" being followed by the letter "L" in a word including a number of characters. The online system may then aggregate the conditional probabilities determined for each character in the word to determine a score for the word. For example, the online system determines an average or sum of the conditional probabilities for each character in the word to determine the score for the word.

Based on the scores associated with each word in the text content of the advertisement, the online system determines if the text content is malicious. In one embodiment, the online system combines the scores of the words in the text content, and compares the combined scores to a threshold value to determine if the text content is malicious. For example, the online system determines an average or a sum of the scores of the words in the text content and determines the text content is malicious if the determined average or sum is less than the threshold value. The online system may increase, decrease, or otherwise modify the threshold value based at least in part on the number of words in the text content of an ad request.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
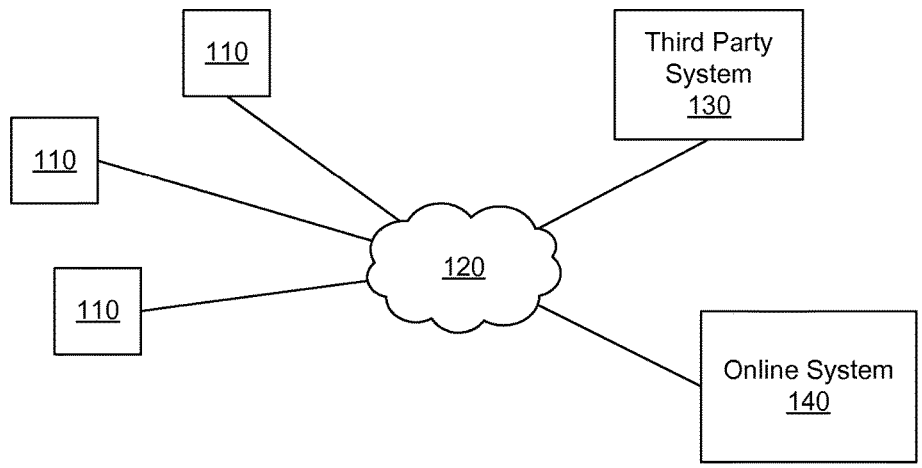
FIG. 1 is a block diagram of a system environment in which an online system operates, in accordance with an embodiment.

FIG. 1 is a high level block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130.

Figure 2:
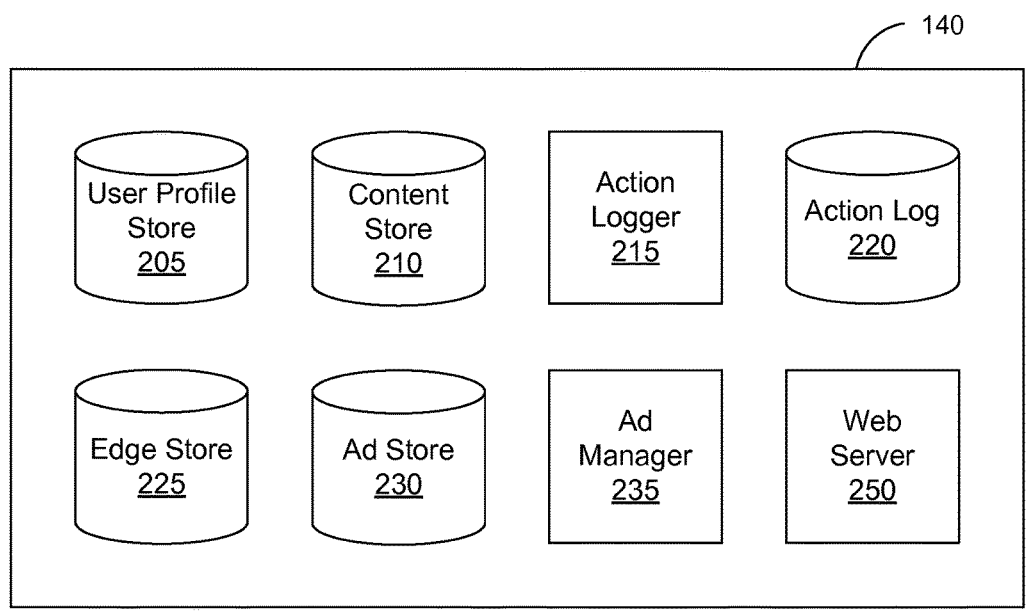
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") store 230, an ad manager 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, and checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object, an interest or in another user in the online system 140 based on the actions performed by the user. A user's affinity may be computed by the online system 140 over time to approximate a user's interest in an object, a topic, or another user in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad store 230. An advertisement request includes advertisement content and a bid amount. The advertisement content is text, image, audio, video, or any other suitable data presented to a user. The advertisement content may also include identifiers identifying the text, image audio, video or any other data included in the advertisement. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the online system 140 if the advertisement is presented to a user, if the advertisement receives a user interaction, or based on any other suitable condition. For example, the bid amount specifies a monetary amount that the online system 140 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The ad manager 235 selects advertisement content from the ad requests in the ad store 230 for presentation to an online system user. When selecting advertisement content, the ad manager accounts for the bid amounts associated with ad request included in the ad store 230. For example, the ad manager 235 determines an expected value associated with various ad requests, with an ad request's expected value based on the ad request's bid amount and a likelihood of the user interacting with advertisement content in the ad request. Based on the expected value associated with the ad requests, the ad manager 235 selects advertisement content from one or more ad requests for presentation to the user.

In addition to selecting advertisement content for presentation to online system users, the ad manager 235 also determines if advertisement content in an ad request includes malicious content, such as malicious text. The ad manager 235 may use various methods to determine if advertisement content includes malicious content. In one embodiment, the ad manager 235 analyzes characters in text content of advertisement content, as further described below in conjunction with FIGS. 3 and 4, to determine if the advertisement content includes malicious content. As malicious advertisers may include different types of text in advertisement content, such as text including characters from different Unicode blocks, to prevent conventional automated review systems from identifying malicious content, the method described below in conjunction with FIGS. 3 and 4 allows for more efficient and accurate identification of malicious content in advertisement content or in more general content.

The web server 240 links the online system 140 via the network 120 to the one or more client devices 110, as well as to the one or more third party systems 130. The web server 140 serves web pages, as well as other web-related content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Identifying Malicious Text in an Advertisement

Figure 3:
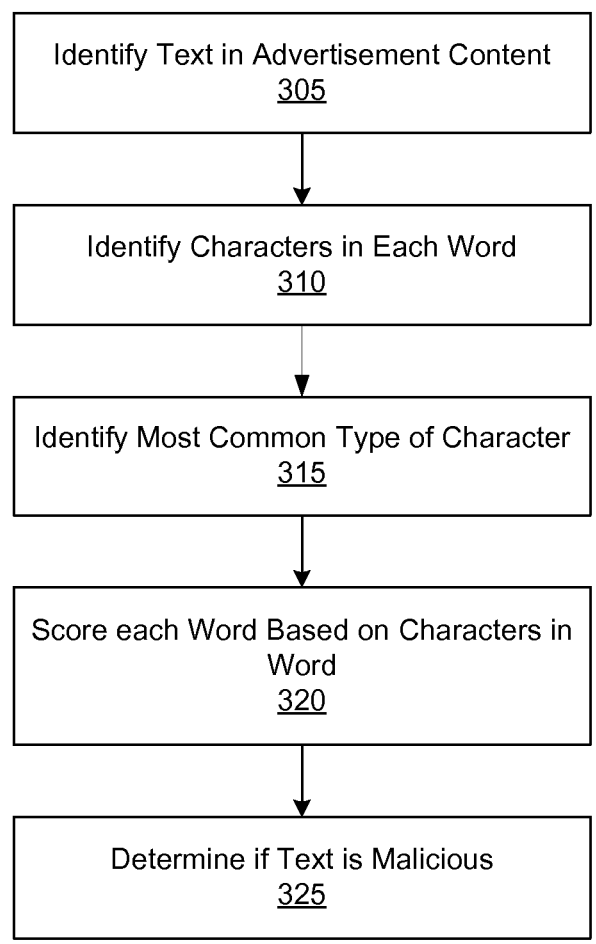
FIG. 3 is a flowchart of a method for identifying malicious text content in advertisement content, in accordance with an embodiment.

FIG. 3 is a flow chart of one embodiment of a method for identifying malicious text in advertisement content. In one embodiment, the steps described in conjunction with FIG. 3 are performed by the ad manager 235; however, in other embodiments, any suitable component or combination of components may provide the functionality described in conjunction with FIG. 3. Additionally, in some embodiments, different and/or additional steps than those identified in FIG. 3 may be performed, or the steps identified in FIG. 3 may be performed in different orders.

The online system 140 receives ad requests from one or more advertisers that include advertisement content for presentation to online system users. The online system 140 reviews advertisement content to determine if the advertisement content includes malicious text or content and prevents advertisement content including malicious text or other content from being presented to online system users. Often, malicious advertisers hide malicious text in advertisement content by including different types of characters in the advertisement content. For example, malicious content may attempt to be hidden by including characters from different Unicode blocks in advertisement content, including characters with diacritics in advertisement content, or including a combination of text symbols (e.g., letters and numbers) in advertisement content.

To determine if a received ad request includes malicious content, the online system 140 identifies 305 text in advertisement content included in the ad request. The ad request and its included text may be retrieved from the ad store 230. Alternatively, the online system 140 requests text associated with an ad request from an advertiser associated with the ad request.

The online system 140 identifies words in the identified text and identifies 310 characters in each word of the identified text. As used herein, "character" refers to a letter, a number, a text symbol, or a representation of a character such as American Standard Code for Information Interchange (ASCI)) code, a Unicode code point, or a group or a range of representations of characters (e.g., the Latin Unicode block or range). In one embodiment, the online system 140 identifies words in the identified text by identifying delimiters in the text that separate words. For example, the online system 140 includes information specifying one or more delimiters (e.g., a space, a comma, a period, etc.) and identifies delimiters in the identified text. One or more characters included in the text between consecutively identified delimiters are identified as a word. Each character is associated with a type that identifies a group or block to which a representation of a character belongs. For example, the letter "I," is a character identified as having a type of "Latin Unicode block." Thus the letter "I," is a "Latin character," or a "Latin Unicode character." In other embodiments, words in the identified text are each associated with identifiers included in the ad store 230, and the words are retrieved from the ad store 230 based on their associated identifiers.

The online system 140 identifies 310 the characters in each word. In one embodiment, the online system identifies letters, numbers and other symbols included in each word. In another example, the online system 140 identifies the Unicode characters in each word. The online system 140 identifies 310 a type associated with each of the characters identified 310 in a word. For example, the online system 140 identifies 310 a Unicode block or group associated with characters identified 310 in a word by analyzing the hexadecimal values or other values used to encode each of the characters. Similarly, the online system 140 may identify 310 letters, numbers or text symbols in a word by analyzing the underlying Unicode values associated with a word.

In each of the identified words, the online system 140 identifies 315 a most common type of character. The online system 140 identifies a type of character associated with each character in an identified word and determines a number of characters associated with different identified types. A type associated with a maximum number of characters in an identified word is identified 315 as a most common type of character in the identified word. For example, a word that is 7 characters long includes 1 Cyrillic Unicode character and 6 Latin Unicode characters; hence the online system 140 identifies 315 the Latin Unicode character type as the most type of character in the word.

Based on the identified characters and the most common type of character in each identified word, the online system 140 scores 320 each of the words identified in the text. In one embodiment, the online system 140 scores 320 a word based on a probability of a word including a set of identified characters or a combination of identified characters. In one embodiment, the online system 140, scores 320 a word based on a conditional probability of the word including a specified number of characters having a Unicode character type. For example, the online system 140 scores 320 a word based on the conditional probability of the word including a number of a particular type of Unicode character given that the word includes an identified number of characters having an identified most common type of character as Unicode characters. As a more specific example, a word includes a single character having a type of Cyrillic Unicode and 10 characters having a type of Latin Unicode. The online system 140 determines the conditional probability of a word that is 11 characters long including a single character having a type of Cyrillic Unicode given that the word includes 10 characters having a type of Latin Unicode.

Figure 4:
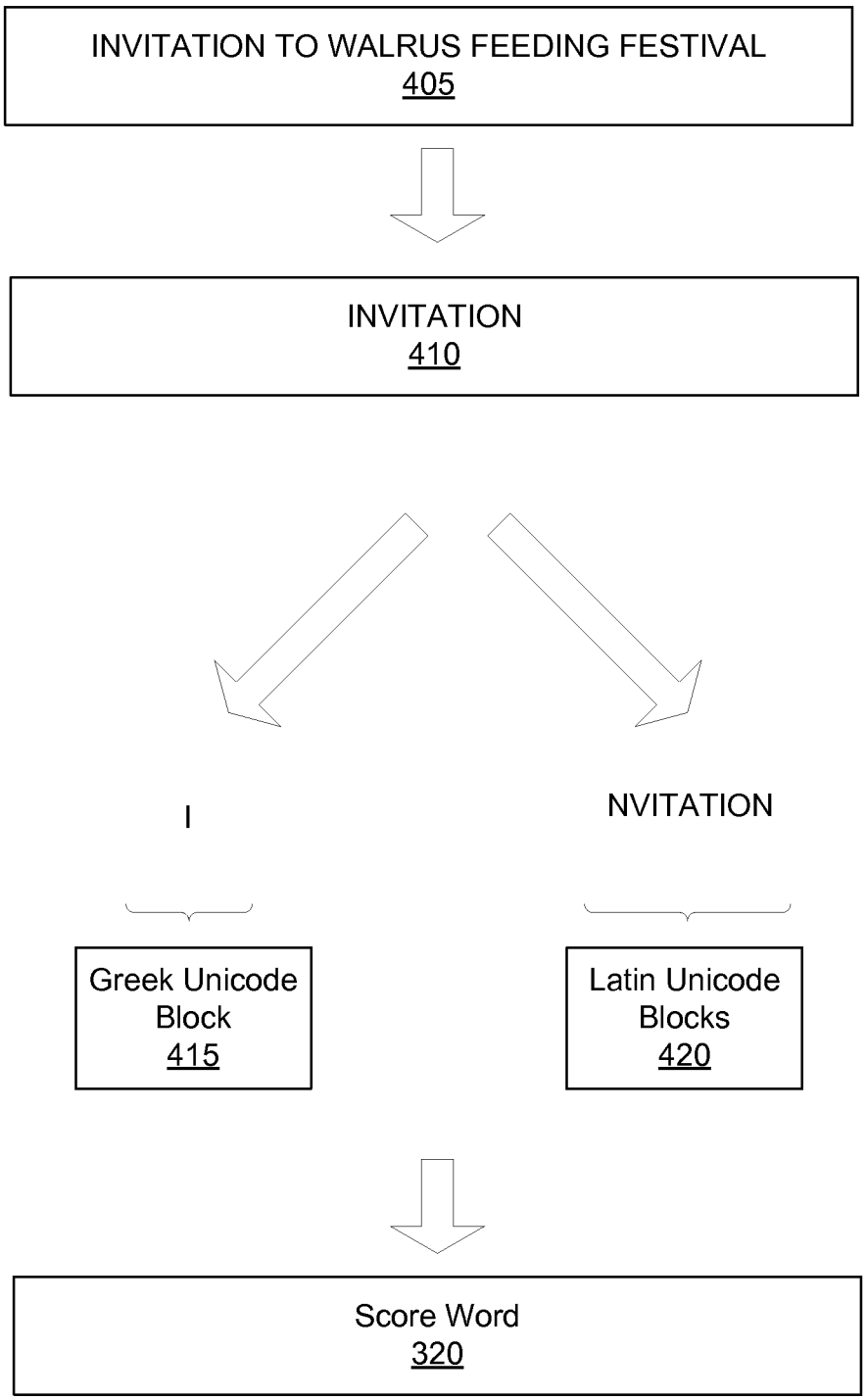
FIG. 4 shows an example of scoring a word in advertisement content based on types of characters identified in the word, in accordance with an embodiment.

FIG. 4 shows an example of scoring 320 a word based on the types of characters included in the word. In the example of FIG. 4, the word is scored 320 based on types of Unicode characters identified in the word. Initially, the online system 140 identifies text 405 included in advertisement content of an ad request. In the example of FIG. 4 the identified text 405 is "Invitation to Walrus Feeding Festival." As described above in conjunction with FIG. 3, the online system 140 identifies each word in the text 405. In the example of FIG. 4, the online system 140 identifies the words "Invitation," "to," "Walrus," and "Feeding" from the text 405. The online system 140 identifies the characters in each word and scores each word based on the characters in each word. FIG. 4 shows an example of scoring 320 the word 410 "Invitation" based on its constituent characters.

The online system 140 identifies the characters in the word 410 "Invitation" and identifies a type associated with each of the identified characters. In the example of FIG. 4, the online system 140 identifies a single character 415 having a type of Greek Unicode and 9 characters 420 having a type of Latin Unicode in the word 410. The online system 140 identifies the most common type of character in the word 410 as Latin Unicode based on the types associated with the identified characters.

Based on the determined types of characters and characters identified in the word 410, the online system 140 scores 320 the word 410 by determining a conditional probability of a word that is 10 characters long including 1 character having a type of Greek Unicode given that the word also includes 9 characters having a type of Latin Unicode. The online system 140 may retrieve the conditional probability from stored information specifying conditional probabilities of varying-length words including different numbers of characters having various types (e.g., a stored value specifying a conditional probability of a 10 character word including one character having a type of Greek Unicode given the 10 character word includes 9 characters having a type of Latin Unicode). In another example, the online system 140 scores 320 the word 410 by determining a conditional probability of a word including a character having a type of Greek Unicode given that the character having the type of Greek Unicode is followed by a character having a type of Latin Unicode or given that the character having the type of Greek Unicode is followed by 9 characters having the type of Latin Unicode.

The online system 140 may generate and store a table including conditional probabilities of a word including one or more Unicode types, a combination of Unicode types, or a type of Unicode character following a different type of Unicode character, from a training set including words with different combinations of characters, including different types of Unicode characters. Alternatively, the online system 140 maintains a trained model to determine a conditional probability or score associated with a word including a combination of types of Unicode characters. However, various other methods may be used to score 320 an identified word in other embodiments.

Returning to the description of FIG. 3, the online system 140 may also score 320 a word based on a combination of text symbols, letters, or numbers in the word. In one embodiment, the online system 140 determines a conditional probability of a specific character, such as a letter or number, following another specific character (e.g., letter or number) in a word. For example, the online system 140 scores 320 a word by determining, for each letter or number in the word, the conditional probability of a letter or number in a word being followed by a subsequent letter or number in the word. As described above, the conditional probabilities may be retrieved from information stored by the online system 140. The conditional probabilities associated with each letter or number in the word are combined to score 320 the word. For example, an average or a sum of the conditional probabilities associated with each letter or number are averaged or summed to score 320 the word.

Based on the scores associated with one or more words in the identified text, the online system 140 determines 325 if the text identified 305 from the advertisement content is malicious. In one example, the online system 140 combines scores associated with each word in the identified text and compares the combined value to a threshold value. For example, an average or a sum of the scores associated with words in the advertisement content is determined and compared to the threshold value. In one embodiment, the online system 140 determines 325 the identified text to be malicious if the combined value of the scores associated with words in the advertisement content is less than a threshold value. The online system 140 may increase, decrease, or otherwise modify the threshold value based on the number of words in the text or based on any other suitable criteria. For example, the online system 140 may decrease the threshold value as the number of words included in text from advertisement content increases.

In another example, the online system 140 identifies the minimum score associated with a word included in the advertisement content and compares the minimum score to the threshold value to determine 325 if the text in the advertisement content is malicious. For example, if the minimum score associated with a word in the advertisement content is less than the threshold value, the online system 140 determines 325 the text in the advertisement content is malicious. As another example, the online system 140 determines the number of words associated with scores less than a threshold value and determines 325 the text is malicious if at least a threshold number of words are associated with scores less than the threshold value. The threshold number of words may be based at least in part on a number of words in the text. For instance, the online system 140 determines that 3 words in text of advertisement content including 10 words have scores less than a threshold value and determines 325 the text is malicious because the number of words associated with scores less than the threshold value exceeds a threshold of 2 words having scores less than the threshold value for text including 10 words. The threshold values and numbers described above may be increased, decreased, or otherwise modified based on the number of words in the text of the advertisement content or based on any other suitable criteria.

Based on the determination of whether the advertisement content includes malicious text, the online system 140 determines whether the advertisement content is eligible for presentation to a user. For example, if an ad request includes text content determined 325 to be malicious, the online system 140 identifies the ad request as ineligible for presentation to online system users. Similarly, if the online system 140 determines 325 an ad request does not include malicious text, the online system 140 determines the ad request is eligible to be presented to online system users and may include the ad request in one or more selection processes identifying content for presentation to one or more online system users.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
retrieving, by a processor of an online system, text included in advertisement content of an advertisement ("ad") request for presentation to a user of the online system;
identifying, by the processor of the online system, one or more words included in the advertisement content;
identifying, by the processor of the online system, one or more Unicode characters comprising each of the one or more words, each of the one or more Unicode characters being associated with a range of Unicode characters that comprise to a Unicode block of a plurality of Unicode blocks;
determining, for each Unicode character of the one or more Unicode characters included in each of the one or more words, a Unicode block associated with the Unicode character;
determining, by the processor of the online system, a score for each word of the one or more words by:
determining, for each of the identified one or more words, a most common Unicode block associated with the one or more Unicode characters in the word;
determining a conditional probability of the one or more Unicode characters being included in the word belonging to a specific Unicode block based at least in part on a number of Unicode characters in the word and a number of Unicode characters in the word associated with the most common Unicode block associated with the Unicode characters in the word; and
determining the score for the word based at least in part on the determined conditional probability, a word of the one or more words comprising Unicode characters associated with a same Unicode block having a higher determined score relative to a word comprising Unicode characters associated with two or more different Unicode blocks;

generating, by the processor of the online system, a combined score for the advertisement based on the determined scores of each word of the one or more words;

determining, by the processor of the online system, that the advertisement content is offensive based at least in part on the combined score for the advertisement being less than a threshold value; and responsive to the combined score for the advertisement being less than the threshold value, determining, by the processor of the online system, that the advertisement content is ineligible for presentation to the user of the online system based at least in part on the determination that the advertisement content is offensive.

2. The method of claim 1, wherein determining the conditional probability further comprises:

determining probabilities of each Unicode character in the word being followed by a subsequent Unicode character in the one or more Unicode characters included in the word being associated with a same Unicode block.

3. The method of claim 2, wherein determining the score for the word based at least in part on the determined probabilities comprises:

determining a sum of the determined probabilities.

4. The method of claim 2, wherein determining the score for the word based at least in part on the determined probabilities comprises:

determining an average of the determined probabilities.

5. The method of claim 1, wherein the threshold value is determined based at least in part on a number of the identified one or more words in the text.

6. The method of claim 1, wherein a character in the identified one or more characters is selected from a group consisting of: a letter, a number, a text symbol, and any combination thereof.

7. The method of claim 1, wherein determining the Unicode block associated with each Unicode character included in each of the one or more words comprises:

analyzing a hexadecimal value used to encode each of the Unicode characters in each of the one or more words, each hexadecimal value corresponding to a Unicode block.

8. A method comprising:

retrieving, by a processor of an online system, text included in advertisement content of an advertisement ("ad") request for presentation to a user of the online system;

identifying, by the processor of the online system, one or more words included in the advertisement content;

identifying a Unicode block associated with each of one or more characters in each of the identified one or more words, each of the one or more characters being associated with a range of characters that comprise to a Unicode block of a plurality of Unicode blocks;

scoring, by the processor of the online system, each word from the identified one or more words by:

determining, for each of the identified one or more words, a most common Unicode block associated with the one or more characters in the word;

determining a conditional probability of the one or more characters being included in the word belonging to a specific Unicode block based at least in part on a number of characters in the word and a number of characters in the word associated with the most common Unicode block associated with the characters in the word; and determining a score for the word based at least in part on the determined conditional probability, wherein a word of the one or more words comprising characters associated with a same Unicode block having a higher determined score relative to a word comprising characters associated with two or more different Unicode blocks;

generating, by the processor of the online system, a combined score for the advertisement based on the determined scores of each word of the one or more words;

determining, by the processor of the online system, that the advertisement content includes offensive content based at least in part on the combined score for the advertisement being less than a threshold value; and responsive to the combined score for the advertisement being less than the threshold value, determining, by the processor of the online system, that the advertisement content is ineligible for presentation to the user of the online system based at least in part on the determination that the advertisement content includes offensive content.

9. The method of claim 8, wherein determining the conditional probability further comprises:

determining probabilities of each character in the word being followed by a subsequent character in the one or more characters included in the word being associated with a same Unicode block.

10. The method of claim 8, wherein the threshold value is based at least in part on a number of the identified one or more words in the text.

11. The method of claim 8, wherein determining the Unicode block associated with each character included in each of the one or more words comprises:

analyzing a hexadecimal value used to encode each of the characters in each of the one or more words, each hexadecimal value corresponding to a Unicode block.

12. A computer program product comprising a non-transitory computer-readable storage medium having instructions encoded thereon that, when executed by a processor, cause the processor to:

retrieve text included in advertisement content of an advertisement ("ad") request for presentation to a user of an online system;

identify one or more words included in the advertisement content;

identify a Unicode block associated with each of one or more characters in each of the identified one or more words, each of the one or more characters being associated with a range of characters that comprise to a Unicode block of a plurality of Unicode blocks;

score each word from the identified one or more words by:

determining, for each of the identified one or more words, a most common Unicode block associated with the one or more characters in the word;

determining a conditional probability of the one or more characters being included in the word belonging to a specific Unicode block based at least in part on a number of characters in the word and a number of characters in the word associated with the most common Unicode block associated with the characters in the word; and determining the score associated with the word based at least in part on the determined conditional probability, wherein a word of the one or more words comprising characters associated with a same Unicode block having a higher determined score relative to a word comprising characters associated with two or more different Unicode blocks;

generate a combined score for the advertisement based on the determined scores of each word of the one or more words;

determine that the advertisement content includes offensive content based at least in part on the combined score for the advertisement being less than a threshold value; and responsive to the combined score for the advertisement being less than the threshold value, determine that the advertisement content is ineligible for presentation to the user of the online system based at least in part on the determination that the advertisement content includes offensive content.

13. The computer program product of claim 12, wherein determining the conditional probability further comprises:

determining probabilities of each character in the word being followed by a subsequent character in the one or more characters included in the word being associated with a same Unicode block.

14. The computer program product of claim 12, wherein the threshold value is based at least in part on a number of the identified one or more words in the text.

* * * * *